(12) United States Patent
Maruyama

(10) Patent No.: US 8,552,343 B2
(45) Date of Patent: Oct. 8, 2013

(54) BRAZING STRUCTURE, CERAMIC HEATER, AND GLOW PLUG

(71) Applicant: Kyocera Corporation, Kyoto (JP)

(72) Inventor: Takahiro Maruyama, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/682,536

(22) Filed: Nov. 20, 2012

(65) Prior Publication Data

US 2013/0157075 A1   Jun. 20, 2013

Related U.S. Application Data

(62) Division of application No. 11/996,583, filed as application No. PCT/JP2006/314748 on Jul. 26, 2006, now Pat. No. 8,324,535.

(30) Foreign Application Priority Data

Jul. 26, 2005  (JP) ................................. 2005-215669

(51) Int. Cl.
    *F23Q 7/22*  (2006.01)
(52) U.S. Cl.
    USPC .......................... 219/270; 219/260; 219/267
(58) Field of Classification Search
    None
    See application file for complete search history.

(56) References Cited

U.S. PATENT DOCUMENTS

| | | | |
|---|---|---|---|
| 4,475,029 A * | 10/1984 | Yoshida et al. | 219/270 |
| 5,998,765 A | 12/1999 | Mizuno et al. | 219/270 |
| 6,078,028 A | 6/2000 | Cooper et al. | 219/270 |
| 2002/0170903 A1 | 11/2002 | Taniguchi et al. | 219/270 |
| 2006/0011601 A1 | 1/2006 | Hamel et al. | 219/270 |
| 2010/0006557 A1 | 1/2010 | Maruyama | 219/267 |
| 2010/0133253 A1 | 6/2010 | Walker, Jr. | 219/270 |
| 2011/0240625 A1 | 10/2011 | Takenouchi | 219/260 |

FOREIGN PATENT DOCUMENTS

| | | |
|---|---|---|
| JP | 61-175755 U | 11/1986 |
| JP | 04-359710 | 12/1992 |
| JP | 11-220008 | 8/1999 |
| JP | 2002-122326 | 4/2002 |
| JP | 2002-195558 | 7/2002 |
| JP | 2005-071943 | 3/2005 |

* cited by examiner

*Primary Examiner* — Thor Campbell
(74) *Attorney, Agent, or Firm* — DLA Piper LLP (US)

(57) ABSTRACT

Disclosed is a brazing structure that includes a ceramic member, a metal layer, a tubular metal fitting and first and second brazing members. The ceramic member includes a small diameter portion and a large diameter portion. The metal layer is located on an outer surface of the large diameter portion. At least an edge of the ceramic member is inserted in the fitting. The first brazing member connects the inner surface of the fitting to the metal layer. The second brazing member does not contact with the metal layer, and fills between at least a part of the small diameter portion and the inner surface, which faces to the part of the small diameter portion, of the fitting. The small diameter portion is located closer to the edge than the metal layer and is inside the fitting.

5 Claims, 7 Drawing Sheets

WITHOUT CHAMFER TREATMENT

WITH CHAMFER TREATMENT

BRAZING STRUCTURE, CERAMIC HEATER, AND GLOW PLUG

BACKGROUND OF THE INVENTION

1. Field of the Invention

The present invention relates to a brazing structure including a ceramic member and a tubular metal fitting brazed thereto, a ceramic heater, and a glow plug. In more particular, the present invention relates to a brazing structure, such as a ceramic heater, used for a soldering iron, a hair iron, an oil-stove igniter, an oil-stove vaporizer, a sealing device, an automobile oxygen sensor, or a glow plug.

2. Description of the Related Art

Heretofore, brazing structures each including a ceramic member and a metal fitting brazed thereto have been used in various industrial devices and instruments and have also been widely used in various application fields. Among the brazing structures described above, a ceramic heater has been widely used, for example, as a semiconductor heating element, an oil vaporization heat source for an oil fan heater or the like, and a heat source for an automobile oxygen sensor, a glow system, or the like. In particular, in recent years, the demand for automobile ceramic heaters has been increasing.

Ceramic heaters having various shapes, such as a plate, a cylindrical, and a tubular shape, have been generally used. FIG. 1 is a cross-sectional view showing the structure of a glow plug having a tubular ceramic heater. In a related ceramic heater 40 as shown in FIG. 1, in one end side of a ceramic member 41 made of insulating ceramics, a coil made of a high melting point metal (such as tungsten) or a heat resistor 42 made of electrical conductive ceramics or the like is buried. An extension portion 43a of this heat resistor 42 at a cathode side is extended through a side surface of the ceramic member 41 and is connected to a tubular metal fitting 44. In addition, an extension portion 43b at an anode side is connected to one end of an electrode lead metal fitting, which is located at an end side opposite to the end side of the ceramic member 41 in which the heat resistor 42 is buried. Furthermore, an external connection terminal 45 is connected to the other end of the electrode lead metal fitting (see Japanese Unexamined Patent Application Publication No. 2002-122326).

However, in the field using the automobile ceramic heaters, the demand of which has been increasing as described above, in order to improve fuel consumption and/or to clean exhaust gas of a diesel engine, an attempt has been made to increase a pressure in combustion by an increase in compression ratio in the engine. Accordingly, even under severe circumstances, such as a high temperature and/or a high pressure, a brazing structure having a highly reliable brazed-welded portion between a ceramic member and a tubular metal fitting has been required.

Accordingly, the present invention has been conceived in consideration of the circumstances described above, and an object of the present invention is to provide a highly reliable brazing structure including a brazed-welded portion which has superior durability even under severe circumstances, such as a high temperature and/or a high pressure.

SUMMARY OF THE INVENTION

To this end, a brazing structure, a ceramic heater, and a glow plug, according to the present invention, have the following structures.

(1) A brazing structure comprises a ceramic member in which a metallized layer is formed on at least a part of an outer surface of the ceramic member, and a tubular metal fitting in which at least a part of the ceramic member is inserted. The inner surface of the tubular metal fitting and the metallized layer are brazed through a brazing member. The ceramic member has a small diameter portion in a region which is located closer to a first end or a second end of the ceramic member than the metallized layer and which is inside the tubular metal fitting. The brazing member fills between a part of the small diameter portion and the inner surface of the tubular metal fitting which faces to the part of the small diameter. The filling portion of the brazing member covers the edge of the metallized layer and contacts the surface of the small diameter portion.

(2) A brazing structure comprises a ceramic member in which a metallized layer is formed on at least a part of an outer surface of the ceramic member, and a tubular metal fitting in which at least a part of the ceramic member is inserted. The inner surface of the tubular metal fitting and the metallized layer are brazed through a brazing member. The ceramic member has a small diameter portion in a region which is located closer to a first end or a second end of the ceramic member than the metallized layer and which is inside the tubular metal fitting. a part of the space between the small diameter portion and the inner surface of the tubular metal fitting is filled with the brazing member not through the metallized layer, the inner surface facing to the part of the small diameter.

(3) The brazing structure as in the brazing structures (1) or (2), wherein at least the first end of the ceramic member is located inside the tubular metal fitting, the small diameter portion is located closer to the first end than the metallized layer, and the diameter of the small diameter portion is gradually smaller toward the first end.

(4) The brazing structure as in one of the brazing structures (1) to (3), wherein the filling portion of the brazing member is combined with a brazing portion of the brazing member which brazes the inner surface of the tubular metal fitting with the metallized layer.

(5) The brazing structure as in one of the brazing structures (1) to (4), wherein the boundary between the outer surface of the small diameter portion and an outer surface of a non-small diameter portion is chamfered.

(6) The brazing structure as in one of the brazing structures (1) to (5), wherein a plated layer having a main component made of nickel is formed on the inner surface of the tubular metal fitting.

(7) The brazing structure as in the brazing structure (6), wherein at least one of a part of the inner surface and an end surface of the tubular metal fitting has a non-plated portion.

(8) The brazing structure as in the brazing structures (6) or (7), wherein the plated layer has a thickness of not less than 0.5 µm.

(9) The brazing structure as in one of the brazing structures (1) to (8), wherein the tubular metal fitting is made of stainless.

(10) A ceramic heater having a structure where a heat resistor is buried in the ceramic member constituting the brazing structure as in one of the brazing structures (1) to (9).

(11) The ceramic heater as in the brazing structure 10, wherein both a first conductive lead and a second conductive lead connecting to the both ends of the heat resistor respectively, are buried in the ceramic member in a condition where the both leads are extended toward the first end. The first conductive lead is electrically connected to the metallized layer. The second conductive lead is extended up to the first end to be connected to an external conductive terminal. The small diameter portion is located between the metallized layer and the external conductive terminal.

(12) A glow plug comprises the ceramic heater as in claim 10 or 11 and a housing into which one end side of the tubular metal fitting of the ceramic heater is inserted.

The "small diameter portion" of the invention means a region whose diameter is partially small in a longitudinal ceramic member.

Effect of the Invention

According to the brazing structure of the present invention, the ceramic member has the small diameter portion in a region which is located closer to the first end or the second end than the metallized layer and which is inside the tubular metal fitting. In addition, the space between at least a part of the small diameter portion and the inner surface of the tubular metal fitting which faces to the part of the small diameter portion is filled with the brazing member. Therefore, a welding strength, which is against a load applied in the axis direction of the ceramic member, is improved. In addition, since this brazing member covers the edge of the metallized layer, compared to the case in which the metallized layer is exposed, the durability of the metallized layer can be improved. Furthermore, the brazing member covers the edge of the metallized layer and is in contact with the surface of the small diameter portion, and hence the position of the edge of the metallized layer is different from that of the edge of the brazing member. Accordingly, since the load applied to the ceramic member and the tubular metal fitting is dispersed to the edge of the brazing member and the edge of the metallized layer, the load can be prevented from being locally concentrated on one point of the ceramic member or the tubular metal fitting. As a result, even under severe conditions, such as a high temperature and/or a high pressure, a highly durable brazing structure including a brazed portion which has high welding reliability can be obtained.

According to the brazing structure of the present invention, the ceramic member has the small diameter portion in a region which is located closer to the first end or the second end than the metallized layer and which is inside the tubular metal fitting. In addition, the space between at least a part of the small diameter portion and the inner surface of the tubular metal fitting which faces to said at least a part of the small diameter portion is filled with the brazing member, without the metallized layer interposed therebetween. Since the brazing member fills between said at least a part of the small diameter portion and the inner surface of the tubular metal fitting which faces to said at least a part of the small diameter portion, a welding strength by the brazing, which is against a load applied in the axis direction of the ceramic member, is improved. In addition, since the metallized layer is not formed between the small diameter portion and the brazing member, the load is received at the strong weld portion between the metallized layer and the brazing member and a direct contact area between the small diameter portion and the brazing member is increased. It enables the contact area to receive a larger load. Accordingly, since the load applied to the ceramic member and the tubular metal fitting is more reliably dispersed to the edge of the brazing member and the edge of the metallized layer, the load can be prevented from being locally concentrated on one point of the ceramic member or the tubular metal fitting.

In a case that the boundary between the outer surface of the small diameter portion of the ceramic member of the present invention and the outer surface of the non-small diameter portion is chamfered, the space between the inner surface of the tubular metal fitting and the small diameter portion is stably filled with the brazing member, and hence the welding reliability of the brazed portion is more improved.

In a case that plating containing nickel as a main component is performed on the inner surface of the tubular metal fitting of the present invention, the wettability between the tubular metal fitting and the brazing member is improved. Accordingly, a welding strength by brazing is further improved. In a case that at least one of the part of the inner surface and the end surface of the tubular metal fitting of the present invention preferably has a non-plated portion. When there is provided the non-plated portion on the one of the part of the inner surface and the end surface of the tubular metal fitting, the brazing member which is molten in brazing is prevented from flowing to a front side past the non-plated portion. When the flow of the brazing member is stopped at a certain position, the brazing member stably fills between the small diameter portion of the ceramic member, which is located at the back side of the tubular metal fitting, and the inner surface thereof. As a result, the welding reliability of the brazed portion is further improved.

Accordingly, a ceramic heater and a glow plug, having the brazing structure of the present invention, have superior durability and also high reliability.

DESCRIPTION OF THE PREFERRED EMBODIMENTS

Figure 1:
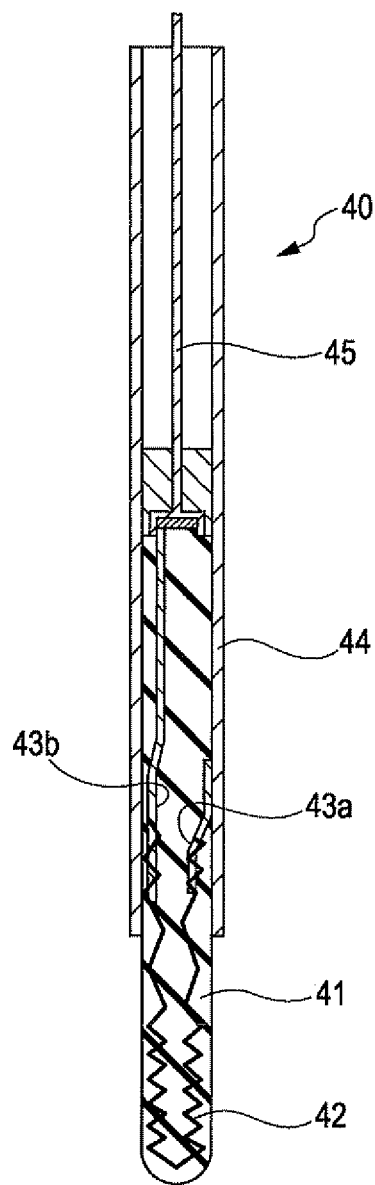
FIG. 1 is a cross-sectional view showing a glow plug having a related ceramic heater.
Figure 2:
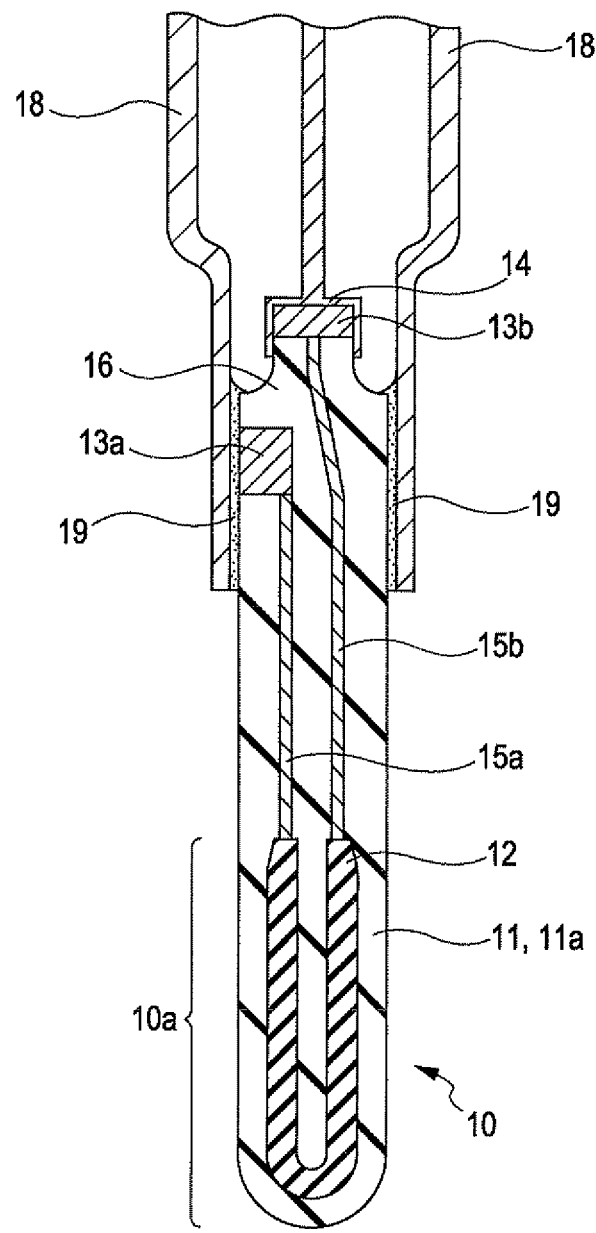
FIG. 2 is a cross-sectional view showing a ceramic heater according to an embodiment of the present invention.

Hereinafter, a ceramic heater, one embodiment of a brazing structure of the present invention, will be described in detail with reference to the drawings. FIG. 2 is a cross-sectional view showing a ceramic heater of this embodiment, and FIG. 3 is a detailed cross-sectional view of the brazed portion shown in FIG. 2.

Figure 3:
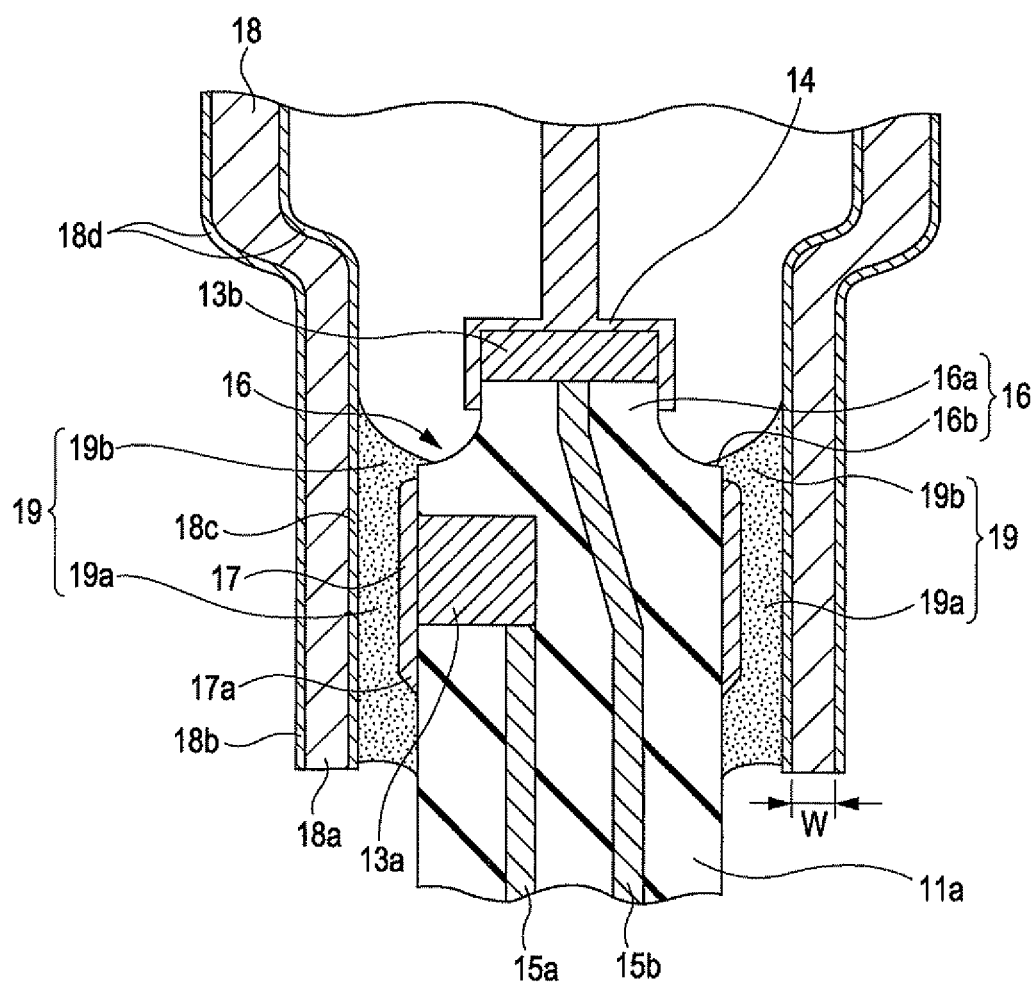
FIG. 3 is a detailed cross-sectional view of the brazed portion shown in FIG. 2.

As shown in FIGS. 2 and 3, a ceramic heater 10 of this embodiment has a rod-shaped ceramic member 11 provided with a metallized layer 17 partly formed on an outer surface and a tubular metal fitting 18 into which the ceramic member 11 is partly inserted. An inner surface of the tubular metal fitting 18 and the metallized layer 17 are brazed together with a brazing member 19a. In order to improve the durability by uniformly performing this brazing, the ceramic member 11 and the tubular metal fitting 18 preferably have a cylindrical shape and a tubular shape, respectively.

One end of the ceramic member 11 is located inside the tubular metal fitting 18. A small diameter portion 16 is located closer to one end side (upper side in FIG. 2) than the metallized layer 17 and is formed so that the diameter is decreased toward the above one end side. This small diameter portion 16 is formed all along the periphery of the ceramic member 11.

A brazing member 19b fills between a part of the small diameter portion 16 and an inner surface 18c of the tubular metal fitting 18 facing thereto. As shown in FIG. 3, the brazing member 19b filling on a part of the small diameter portion 16 is united with the brazing member 19a brazing the inner surface 18c of the tubular metal fitting 18 and the metallized layer 17. In addition, the tubular metal fitting 18 is strongly bonded to the metallized layer 17 with the brazing member 19a. Furthermore, since the brazing member 19b fills on the part of the small diameter portion 16, a catch portion extending onto the small diameter portion 16 is formed from the brazing member 19b, and hence the movement of the other end side (lower side in FIG. 3) of the ceramic member 11 is regulated (the catch portion functions as a wedge). As a result, even when being used under severe conditions, such as a high temperature and/or a high pressure, the ceramic heater 10 can be obtained in which the brazed portion has a significantly high welding reliability.

In addition, the brazing member 19b fills between a part of the small diameter portion 16 and an inner surface 18c of the tubular metal fitting 18 without the presence of the metallized layer 17. In the case that the brazing member 19b fills in the manner as described above, the brazing member covers the edge of the metallized layer 17. Hence, compared to the case in which the metallized layer 17 is exposed, the durability of the metallized layer 17 can be improved. In addition, when the brazing member covers the edge of the metallized layer 17, the edge of the brazing member 19a is directly brought into contact with the surface of the small diameter portion 16. Hence, the edge of the metallized layer 17 and the edge of the brazing member 19b are located at different positions. Accordingly, a load applied to the ceramic member 11 and/or the tubular metal fitting 18 is dispersed to the edge of the brazing member 19b and the edge of the metallized layer 17, and as a result, the load is prevented from being locally concentrated on one point.

According to the present invention, it is more preferable that the metallized layer 17 be not formed between the small diameter portion 16 and the brazing member 19b. Accordingly, a strong welded portion between the metallized layer 17 and the brazing member 19a receives a load, and in addition, since the direct contact area between the small diameter portion 16 and the brazing member 19 is increased, a larger load can be received by this contact portion. Hence, the load applied to the ceramic member 11 and/or the tubular metal fitting 18 is reliably dispersed to the edge of the brazing member 19b and the edge of the metallized layer 17, so that the load is prevented from being locally concentrated on one point.

Figure 7:
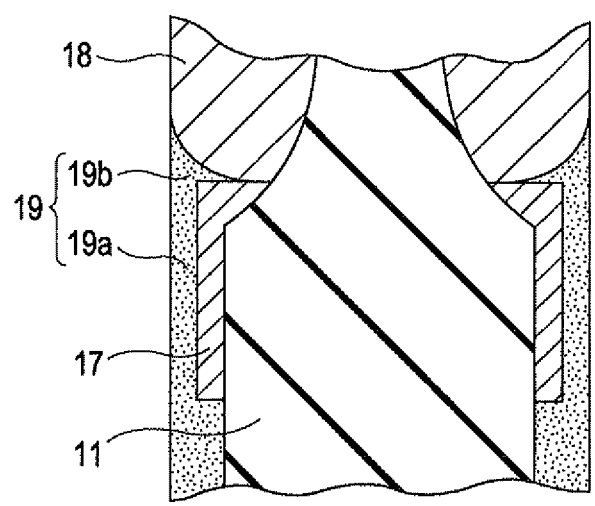
FIG. 7 is a schematic view showing the state in which a brazing member fills on a small diameter portion with a metallized layer interposed therebetween.

On the other hand, in a case that the brazing member 19b fills between the small portion 16 and the inner surface 18c facing thereto with the presence of the metallized layer 17, as shown in FIG. 7, the load applied to the ceramic member 11 and/or the tubular metal fitting 18 is liable to be concentrated on the edge of the brazing member 19b and/or the edge of the metallized layer 17. That is, when only the edge of the metallized layer 17 is in contact with the surface of the small diameter portion 16, as shown in FIG. 7, the load is concentrated on the edge of the metallized layer 17. In addition, when the edge of the brazing member 19b and the edge of the metallized layer 17 are located at almost the same position, the effect of dispersing a load, described above, cannot be obtained.

The brazing member 19b and the brazing member 19a may be separately provided. However, the brazing member 19b and the brazing member 19a are preferably united together. When the brazing members 19a and 19b are united together, the brazing member 19b, which fills on the small diameter portion 16 without the presence of the metallized layer 17, is supported by the brazing member 19a bonded to the metallized layer 17 with a strong bonding force. Hence, the welding reliability of the welded portion by brazing is further improved. In addition, when the brazing member 19a and the brazing member 19b are united together, a stress caused by the load applied to the tubular metal fitting 18 and/or the ceramic member 11 is widely dispersed. Accordingly, since the load is suppressed from being concentrated only on the edge of the brazing member 19b or the like, brazing having a high strength and a high reliability can be performed. In addition, since the brazing member 19b functions as a buffer member, it can receive the stress caused by the load applied to the ceramic member 11. As a result, the stress is suppressed from being concentrated on the part of the ceramic member 11, and by this stress dispersion effect, brazing having a high strength and a high reliability can be performed.

Figure 4A:
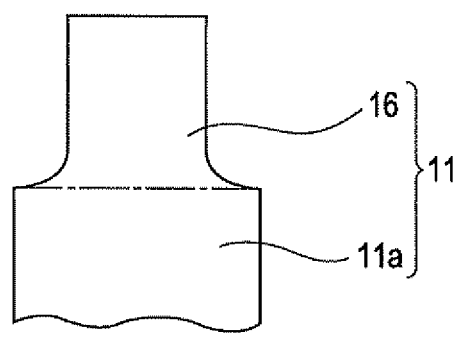
FIG. 4A is a schematic view showing one example of a small diameter portion of a ceramic member according to the present invention.
Figure 4B:
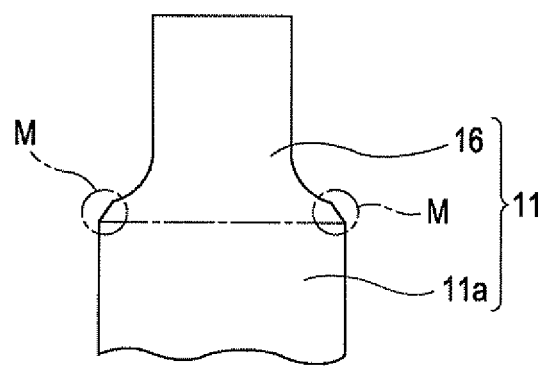
FIG. 4B is a schematic view showing another example of the small diameter portion of the ceramic member according to the present invention.

FIG. 4A is a schematic view showing one example of the small diameter portion of the ceramic member according to the present invention. FIG. 4B is a schematic view showing another example of the small diameter portion of the ceramic member according to the present invention. FIG. 4A shows the case in which the boundary between an outer surface of the small diameter portion 16 and an outer surface of a non-small diameter portion is not chamfered. FIG. 4B shows the case in which the boundary between the outer surface of the small diameter portion 16 and the outer surface of the non-small diameter portion is chamfered. It is preferable that the boundary between the outer surface of a neck 16b of the small diameter portion and the outer surface of the non-small diameter portion be chamfered, as shown in FIG. 4B. This is because in this case, a chamfered portion M functions as a buffer, and hence the brazing member fills more easily. This is also because it enables the brazing member to stably fill between a neck 16b of the small diameter portion 16 and the inner surface of the tubular metal fitting 18, and brazing having a high strength and a high reliability, against the load applied from the other end side of the small diameter portion 16, can be performed.

In this embodiment, "the boundary is chamfered" indicates the state in which the outer surface of the small diameter portion and the outer surface of the non-small diameter portion are smoothly connected to each other to form a C surface or an R surface, as shown in FIG. 4B, by performing a chamfer treatment for a corner (angular corner) formed along a boundary (intersecting edge line) between the outer surface of the small diameter portion and the outer surface of the non-small diameter portion, as shown in FIG. 4A. In addition, the curvature radius or the inclined angle of the chamfered surface is not particularly limited. The chamfering may be performed so as to smoothly connect between the outer surface of the small diameter portion and the outer surface of the non-small diameter portion.

In the present invention, the brazing member 19 filling between at least a part of the small diameter portion 16 and the inner surface 18c of the tubular metal fitting 18, the effect of the present invention can be obtained. The brazing member 19 preferably fills all around the periphery of the small diameter portion 16 of the ceramic member 11.

The ceramic member 11 has a heating portion 10a by burying the heat resistor 12 therein having a U shape in any form such as a sheet, a rod, and a coil. This heating portion 10a protrudes outside from the front end of the tubular metal fitting 18. An end (back side end) of the ceramic member 11, which is far from this heating portion 10a, is located inside the tubular metal fitting 18.

Conductive leads 15a and 15b are connected to both ends of the heat resistor 12 respectively. These conductive leads 15a and 15b are buried in the ceramic member 11 so as to be extended to one end side of the ceramic member 11. The conductive lead 15a is electrically connected to the metallized layer 17 formed on the outer surface of the ceramic member 11 through an extension portion 13a partly exposed to the surface of the ceramic member 11. The exposed portion of the extension portion 13a is covered with the metallized layer 17. In addition, the other conductive lead 15b is extended to one end of the ceramic member 11 and is connected to an anode terminal (external terminal) 14 through an extension portion 13b. Accordingly, an electric power can be supplied to the heat resistor 12. The small diameter portion 16 is formed between the anode terminal 14 and the metallized layer 17.

The extension portion 13b and the tubular metal fitting 18 are connected to each other through the metallized layer 17 and the brazing member 19a. The tubular metal fitting 18 has a function as an electrode. Hence, when electricity is applied to the tubular metal fitting 18 and the extension portion 13a from an external power source, current is allowed to flow into the end portion of the heat resistor 12 having a U shape, provided in the ceramic member 11. As a result, the heat resistor 12 generates heat. The heat thus generated transmits inside the ceramic member 11 and reaches the surface thereof, thereby heating a substance to be heated.

The heat resistor 12 has, in general, an electrical conductive component and an insulating component. As this electrical conductive component, for example, there may be mentioned at least one of a silicide, a carbide, and a nitride, which contains at least one element selected from the group consisting of W, Ta, Nb, Ti, Mo, Zr, Hf, V, Cr, and the like. As the insulating component, for example, a silicon nitride-based sintered body may be mentioned. In particular, when silicon nitride is contained in the insulating component of the heat resistor 12 and/or a component forming the ceramic member 11, as the electrical conductive component, at least one of tungsten carbide, molybdenum silicide, titanium nitride, and tungsten silicide is preferably used. The coefficient of thermal expansion of the electrical conductive component is preferably not so much different from that of the insulating component and that of the component forming insulating member. In addition, the melting point is preferably more than a service temperature (1,400° C. or more, or 1,500° C. or more) of the ceramic heater. In addition, the ratio in volume of the electrical conductive component to the insulating component is not particularly limited; however, with respect to 100 percent by volume of the heat resistor, the amount of the electrical conductive component is preferably set in the range of 15 to 40 percent by volume, and is more preferably set in the range of 20 to 30 percent by volume.

The ceramic member 11 is formed of electrical insulating ceramics. Although this electrical insulating material is not particularly limited, nitride ceramics are preferably used. The reason for this is that since nitride ceramics have a relatively high thermal conductivity, it can efficiently transmit heat from the front side to the back side of the ceramic member 11. Accordingly, the difference in temperature between the front side and the back side of the ceramic member 11 can be decreased. The nitride ceramics may be formed, for example, from only one of silicon nitride-based ceramics, SiAlON, and aluminum nitride ceramics. The nitride ceramics may be a mixture containing at least one of silicon nitride-based ceramics, SiAlON, and aluminum nitride ceramics as a main component. In particular, a ceramic heater and a glow plug, having a high heat shock resistance and superior durability, can be obtained by having silicon nitride-based ceramics. As this type of silicon nitride-based ceramics, many ceramics containing silicon nitride as a main component may be mentioned, and besides silicon nitride, for example, SiAlON may also be mentioned.

The metallized layer 17 is preferably processed by plating since the wettability with the brazing member 19a is improved and the durability is also improved thereby. Plating is preferably performed using Au, Ni, or the like.

The tubular metal fitting 18 is formed of an electrical conductive material and is required to withstand a brazing temperature. In particular, an alloy primarily composed of iron is preferable, a high heat-stable alloy particularly including iron and Cr as main components is more preferable, stainless steel is even more preferable among the above alloys, and a stainless steel alloy primarily including iron, Ni and Cr is further preferable.

A metal layer 18d is formed on the inner surface 18c of the tubular metal fitting 18. The metal layer 18d is preferably formed from Ni, Au, Pt, Pd, Ag, Cu, or an alloy thereof and is more preferably formed from Ni. In the case that the metal layer 18d is the Ni plating, superior brazing properties can be obtained. In particular, boron-based Ni plating is preferable since it is superior in durability. In order to uniformly form the metal layer 18d, a plating treatment is preferably performed.

It is preferable that at least one of a part of the inner surface 18c of the tubular metal fitting 18 and an end surface 18a thereof have a non-plated portion which is not provided with a metal layer by plating or the like, and that a brazing member 19 be not present on this portion. The non-plated portion is preferably formed to have a circle shape of a width W of 0.1 mm or more along the end surface 18a of the tubular metal fitting 18. By the presence of this non-plated portion, the brazing member 19 is prevented from spreading to the other end of the tubular metal fitting 18 and to an outer surface 18b thereof during brazing. Accordingly, the brazing member 19a can be stably held on a desired portion to be brazed, and the brazing member 19b can stably fill to the part of the small diameter portion 16. As a result, highly reliably brazing can be performed. The width W is preferably 0.15 mm or more and more preferably 0.2 mm or more. The reason for this is that the ceramic heater 10 can be formed to have high reliability.

The thickness of the metal layer 18d is 0.5 μm or more, preferably 0.5 to 12 μm, more preferably 0.5 to 10 μm, even more preferably 3 to 9 μm, and further preferably 4 to 8 μm. Accordingly, since the wettability between the surface 18c of the tubular metal fitting 18 and the brazing member 19 is improved, the brazing member 19 stably fills between the neck 16b of the small diameter portion 16 and the inner surface 18c of the tubular metal fitting 18. As a result, a brazing member well is stably formed on the small diameter portion 16.

Figure 5:
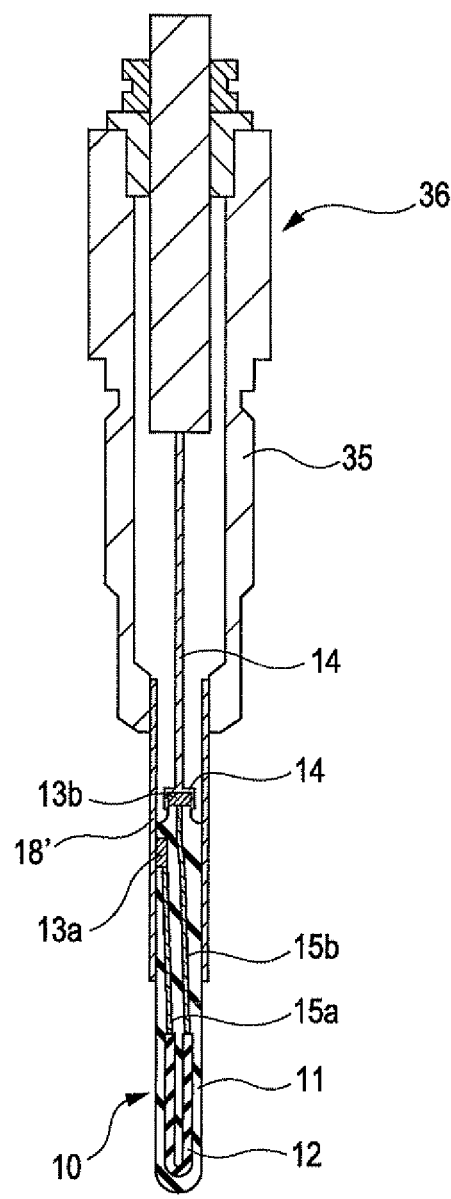
FIG. 5 is a cross-sectional view showing one example of a glow plug having a ceramic heater of the embodiment of the present invention.

FIG. 5 is a cross-sectional view showing one example of a glow plug having the ceramic heater of this embodiment. As shown in FIG. 5, a glow plug 36 has the ceramic heater 10 and a housing 35 into which one end side of a tubular metal fitting 18' of the ceramic heater 10 is inserted. The anode terminal 14 of the ceramic heater 10 is extended inside the housing 35. The other parts are designated by the same reference numerals as those shown in FIGS. 2 and 3, and a description thereof is omitted.

Hereinafter, examples of methods for manufacturing the ceramic heater and the glow plug, according to this embodiment, will be described.

In order to make the ceramic member 11, a paste having the electrical conductive component and the insulating component, which are described as components constituting the heat resistor 12 is made, then, this paste is buried in the above electrical insulating ceramics. This paste includes approximately 75 to 90 percent by mass of the total of the electrical conductive component and the insulating component when the entire paste is regarded as 100 percent by mass. For example, this paste can be obtained by the steps of performing wet mixing of powdered raw materials in predetermined amounts, followed by drying, and further performing mixing, for example, with a binder, such as a resin or a wax, in a predetermined amount. This paste may be formed into pellets by appropriate drying for easy handling.

As a method for burying a conductive lead in ceramics, various known methods may be used. For example, a conductive lead can be buried by fixing it in the mold, then injecting a paste inside the mold. Alternatively, a conductive lead can be buried by inserting it into a paste which is formed beforehand to have a predetermined shape. As another method, the following may also be mentioned. First, a molded body is formed using a powdered raw material for a rod-shaped substrate by press molding. Next, a paste to be formed into the heat resistor 12 is prepared using a binder and the like. Subsequently, this paste may be printed on the molded body by a screen printing method so as to form conductive shapes, such as the heat resistor 12, the conductive leads 15a and 15b, and the extension portions 13a and 13b. By using one of the methods described above, the heat resistor 12 is pressed to mold integrally together with a raw material for the ceramic member 11, and hence a molded body of the ceramic member 11 including the small diameter portion 16 is obtained. The small diameter portion 16 of this embodiment has a cylindrical front portion 16a, as shown in FIG. 3.

Next, this molded body is placed in a pressurizing die made of graphite or the like, and the die is then placed in a firing furnace. In addition, whenever necessary, the molded body is calcined to remove the binder. Subsequently, hot-press firing is performed for the molded body at a predetermined temperature for a predetermined time. As a result, the ceramic member 11 is obtained. As described above, the electrical insulating ceramics forming the ceramic member 11 is fired, in general, simultaneously together with the heat resistor 12, the conductive leads 15a and 15b, the extension portions 13a and 13b, and the like. After the firing, these described above are united together.

The electrical insulating ceramics may have sufficient electrical insulation properties for the heat resistor 12 and the conductive leads 15a and 15b at a temperature in the range of −20 to 1,500° C. In particular, the electrical insulating ceramics preferably have an insulation property of $10^8$ times or more that of the heat resistor 12.

In general, the electrical insulating ceramics contain approximately 2 to 10 percent by mass of a sintering auxiliary agent. A powdered sintering auxiliary agent is not particularly limited, and a rare earth oxide powder or the like, which is generally used in firing of silicon nitride, may be used. In particular, for example, an oxide of Y, Yb, or Er, may be used, and a powdered sintering auxiliary agent, particularly such as $Er_2O_3$, which forms grain boundaries having a crystal phase in sintering, is more preferably used since the heat durability is improved. The electrical insulating ceramics preferably include a boride of each metal element forming the heat resistor 12. The electrical insulating ceramics preferably may include a small amount of an electrical conductive component to decrease the difference in coefficient of thermal expansion from the above electrical conductive component constituting the heat resistor 12. The anode terminal 14 is fitted into the extension portion 13b and the front portion 16a and is then bonded thereto by brazing.

The small diameter portion 16 may be simultaneously formed on the above press molding, or may be formed by milling or the like after the ceramic member 11 is press-molded. The conduction lead 15b is exposed to the outside by forming the small diameter portion 16 by the press molding, milling, or the like. The conduction lead 15b may be eccentric from the axis of the ceramic member 11. The extension portion 13b and the anode terminal 14 are connected to the side surface of the conduction lead 15b. Accordingly, a connection area of the conduction lead 15b with the extension portion 13b and the anode terminal 14 is increased, and hence the connection can be more reliably performed. In addition, the conduction lead 15a is electrically connected to the metallized layer 17 formed on the outer surface of the ceramic member 11 through the extension portion 13a.

The metal layer 18d is formed on the inner surface 18c of the tubular metal fitting 18. In this step, the portion (non-plated portion) at which the metal layer is not formed is provided at the part of the inner surface 18c of the tubular metal fitting 18 and/or the end surface thereof. Accordingly, the tubular metal fitting 18 is brazed with the ceramic member 11, which will be described later; the brazing member 19 is prevented from spreading to the outer surface 18b side of the tubular metal fitting 18. The non-plated portion has low wettability with the brazing member 19 and thereby stops the flow thereof, and hence the brazing member 19 can stably fill between the small diameter portion 16 and the inner surface 18c of the tubular metal fitting 18.

Next, the ceramic member 11 and the tubular metal fitting 18 are brazed together. The brazing member 19 which is molded beforehand in the form of a ring is used and is disposed in the vicinity of the small diameter portion 16. Then, the ceramic member 11 is inserted into the tubular metal fitting 18 and the brazing member 19 is heated to a predetermined temperature, thereby the fluidity thereof can be obtained. Hence, the brazing member 19 flows between the metallized layer 17 and the inner surface 18c of the tubular metal fitting 18 provided with the metal layer 18d, and is then stopped at the non-plated portion. In addition, a part of the brazing member 19 (brazing member 19b) also fills between the part of the small diameter portion 16 and the inner surface 18c of the tubular metal fitting 18. The amount of the brazing member 19 is set so that it fills between the part of the small diameter portion 16 and the inner surface 18c of the tubular metal fitting 18. Accordingly, the ceramic heater 10 can be obtained. This ceramic heater 10 is fixed to the housing 35 by brazing and caulking, so that the glow plug 36 is obtained.

In addition, the ceramic heater and the glow plug according to the present invention are not limited to the above embodiments, and various modifications may be made without departing from the substance of the present invention.

Figure 6A:
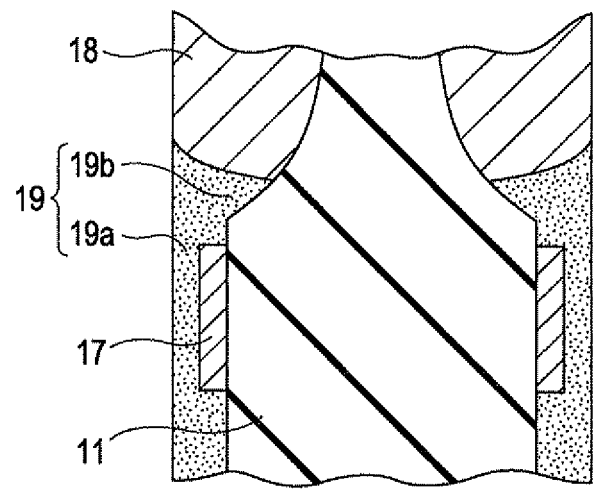
FIG. 6A is a schematic view showing the state in which a metallized layer is not formed on a small diameter portion.
Figure 6B:
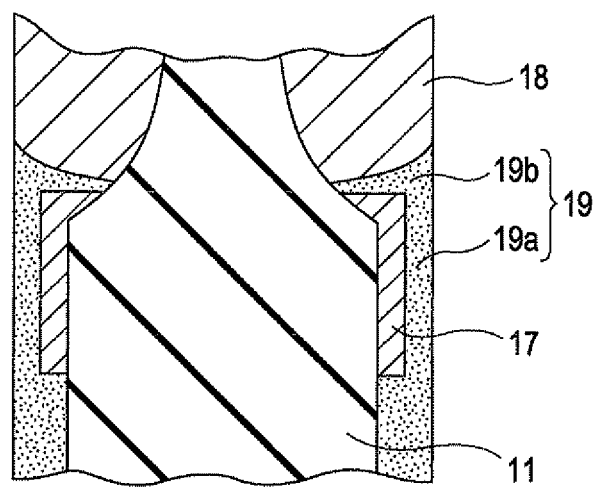
FIG. 6B is a schematic view showing the state in which a metallized layer is also formed partly on a small diameter portion.

For example, besides the case in which the metallized layer formed on the outer surface of the ceramic member 11 is not formed on the small diameter portion 16, as shown in FIG. 6A, the metallized layer may be formed on part of the small diameter portion, as shown in FIG. 6B.

In addition, according to the present invention, as the tubular metal fitting 18, a seamless tubular shape may be used, and a tubular shape formed by winding a metal wire in a coil configuration may also be used.

Hereinafter, the present invention will be described in more detail with reference to examples; however, the present invention is not limited thereto.

Examples

By the following methods, the ceramic heater 10 shown in FIGS. 2 and 3 and the glow plug 36 shown in FIG. 5 were formed.

First, as an electrical insulating ceramic material forming the ceramic member 11, 90 to 92 percent by mole of silicon nitride was used as a main component and 2 to 10 percent by mole of a rare earth oxide was used as a sintering auxiliary agent. Next, with respect to the total of the silicon nitride and the rare earth oxide, 0.2 to 2.0 percent by mass of aluminum oxide and 1 to 5 percent by mass of silicon oxide were added and mixed, so that a powdered raw material was obtained.

Subsequently, the powdered raw material thus obtained was molded by a press molding method to form a molded body. A heat generation paste was formed by adding an appropriate organic solvent and the like to tungsten, followed by mixing. Then, the paste thus prepared was printed on the upper surface of the molded body by a screen printing method to form conductive shapes of the heat resistor 12, and the extension portions 13a and 13b.

Furthermore, electrical conductive members (conduction leads) primarily composed of tungsten were provided between the heat resistor 12 and extension portions 13 so as to form tight connections therebetween. The electrical insulating ceramics, the heat resistor 12, and the like were fired together by a hot-press firing at approximately 1,650 to 1,800° C. so as to be united together.

Subsequently, the extension portion 13a is milled to have a smaller diameter and the extension portion 13b is centerless-grinded into a cylindrical shape to form an electrode lead portion. Next, a paste containing Ag—Cu—Ti was applied so as to cover the surface of the extension portion 13a and was then fired in vacuum to form the metallized layer 17.

The tubular metal fitting 18 was brazed to the ceramic member 11 thus obtained. In this step, various samples were formed by changing the amount of a brazing member filling between the small diameter portion 16 and the inner surface of the tubular metal fitting. A current-supply endurance test was performed for these samples as described below. First, a voltage was applied to the heat resistor 12 to increase the temperature of the ceramic heater to 1,400° C., so that the heat resistor 12 was heated by Joule heating. The time for applying a voltage to the heat resistor 12 was 5 minutes. Subsequently, the voltage application was stopped, and a compressed air at room temperature was blown to a maximum heating portion of the ceramic heater, so that the ceramic heater was forcedly cooled. The time for the forced cooling by blowing was 3 minutes. The heat cycle of the above heating and the above cooling was repeatedly performed 10,000 times.

Next, a vibration test was further performed for some of the samples which were evaluated by the above current-supply endurance test. The vibration test was performed under the conditions in which a weight of 50 g was provided at the front end (end of the lower side in FIG. 2) of the ceramic heater 10, and the tubular metal fitting 18 was fitted to a fixture of a vibration test device. The test conditions are as shown below.
Vibration acceleration: 30 G
Vibration frequency: 1,000 Hz
Number of vibration: $10^8$
Weight: 50 g Next, by using initial samples, samples after the current-supply endurance test, and samples after the current-supply endurance test and the vibration test, the bonding strength of the brazed portion was evaluated. An evaluation method was performed as described below. That is, under the conditions in which the tubular metal fitting 18 was held and the brazed portion was heated to 500° C., a load was applied to the ceramic member 11 from the bottom side to the top side shown in FIG. 2, and a load at which the ceramic member 11 was moved was investigated. The results are shown in Table 1. The load at which the ceramic member was moved was used for evaluation, that is, in Table 1, ◉ (excellent) indicates a load of 80 kgf or more, ○ (good) indicates a load of 60 kgf or more, Δ (fair) indicates a load of 50 kgf or more, and × (no good) indicates a load of less than 50 kgf.

TABLE 1

|  | NO BRAZING MEMBER ON SMALL DIAMETER PORTION | BRAZING MEMBER ON PART OF SMALL DIAMETER PORTION | | BRAZING MEMBER ALL AROUND SMALL DIAMETER PORTION | |
|---|---|---|---|---|---|
|  |  | FIG. 7 | FIG. 6B | FIG. 7 | FIG. 6B |
| INITIAL SAMPLE | 124 kgf | 127 kgf | 132 kgf | 155 kgf | 162 kgf |
| SAMPLE AFTER CURRENT-SUPPLY ENDURANCE TEST | 15 kgf | 61 kgf | 69 kgf | 73 kgf | 91 kgf |
| SAMPLE AFTER CURRENT-SUPPLY ENDURANCE TEST AND VIBRATION TEST | Not more than 1 kgf | 51 kgf | 62 kgf | 58 kgf | 84 kgf |
| JUDGMENT | × | Δ | ○ | Δ | ◉ |

As apparent from Table 1, in the samples within the range of the present invention, in which at least a part of the space between the small diameter portion and the inner surface of the tubular metal fitting is filled with the brazing member, a good result was obtained indicating a load of 61 kgf or more by the current-supply endurance test. In addition, in the samples, in which the entire circumference of the small diameter portion was covered with the brazing member, a significantly excellent result was obtained indicating a load of 73 kgf or more by the current-supply endurance test. The reason for this is believed that the filled with brazing member functions as a wedge.

On the other hand, in the sample outside of the present invention, in which the space between the small diameter portion and the inner surface of the tubular metal fitting was filled with no brazing member, the load obtained by the current-supply endurance test was 15 kgf, and when the vibration test was performed following the current-supply endurance test, the load was decreased to 1 kgf or less.

Next, filling performance of the brazing member was investigated with and without a chamfer treatment (the shape of the neck 16b of the small diameter portion for this evaluation is shown in FIG. 4A or 4B) for the boundary between the outer surface of the small diameter portion and the outer surface of the non-small diameter portion. The results are shown in Table 2. The values shown in Table 2 each indicate the filling rate (the ratio of the number of samples in which the entire circumferences to 100 samples (N) were filled with the brazing member.

TABLE 2

|  | WITHOUT CHAMFER TREATMENT | WITH CHAMFER TREATMENT |
|---|---|---|
| FILLING RATE OF BRAZING MEMBER BETWEEN SMALL DIAMETER PORTION AND INNER SURFACE OF TUBULAR METAL FITTING | 84% | 100% |

(N=100)

As apparent from Table 2, it was confirmed that in all the samples which were processed by a chamfer treatment, the entire circumference of the region between the chamfered portion and the inner surface of the metal fitting is filled with the brazing member. The reason for this is believed that by the chamfer treatment, the space between the chamfered portion and the inner surface of the metal fitting could be stably filled with the brazing member, without receiving any influences caused by the shape of the neck 16b of the small diameter portion.

On the other hand, the samples which were not processed by the chamfer treatment had a result showing a low filling rate between the small diameter portion and the inner surface of the metal fitting. In some of the above samples, the space between the small diameter portion and the inner surface of the metal fitting was not filled with the brazing member at all. The reason for this is believed that since the small diameter portion was not wet with the brazing member, the brazing member is liable to be attracted to the inner surface of the tubular metal fitting when the amount of the brazing member was not sufficient, and as a result, the space between the small diameter portion and the inner surface of the tubular metal fitting was not filled with the brazing member.

The invention claimed is:

1. A brazing structure comprising:
a ceramic member comprising:
  a first portion having a first diameter;
  a second portion having a second diameter larger than the first diameter; and
  a third portion between the first portion and the second portion, the third portion having a varying diameter that is larger than the first diameter and smaller than the second diameter;
a metal layer on an outer surface of the second portion;
a tubular metal fitting in which at least an edge of the ceramic member is inserted; and
a brazing member comprising:
a first brazing member located between the inner surface of the tubular metal fitting and the metal layer; and
a second brazing member located between the inner surface of the tubular metal fitting and the outer surface of the second portion of the ceramic body adjacent the third portion of the ceramic body in which the metal layer is not located, and being in contact with a part of the third portion of the ceramic body.

2. A brazing structure comprising:
a metal fitting having a tubular shape and comprising an inner surface;
a ceramic member comprising a side surface, the side surface comprising:
  a first portion having a first diameter and located inside of the metal fitting;
  a second portion having a second diameter larger than the first diameter and located partially outside of the metal fitting; and
  a third portion having the second diameter, and located inside of the metal fitting between the first portion and the second portion;
a metal layer located on the second portion; and
a brazing member, comprising:
  a first brazing member located between the inner surface and the metal layer; and
  a second brazing member located between the inner surface and the third portion, and being in contact with the inner surface to a part of the first portion.

3. The brazing structure according to claim 2 further comprising a heating element located inside of the ceramic member and outside of the metal fitting.

4. A brazing structure comprising:
a metal fitting having a tubular shape and comprising an inner surface;
a ceramic member comprising:
  first and second end surfaces in longitudinal direction, wherein the first end surface is located inside the metal fitting and the second end surface is located outside the metal fitting;
  a first portion directly connected to the first end surface; and
  a second portion adjacent to the first portion directly connected to the second end surface,
  wherein the first portion having a diameter smaller than that of the second portion;
a metal layer on an outer surface of the second portion; and
a brazing member, comprising:
  a first brazing member directly located between the inner surface of the metal fitting and the metal layer; and
  a second brazing member located between the inner surface of the metal fitting and the outer surface of the second portion adjacent the first portion in which the metal layer is not located, and being in contact with the outer surface of the first portion.

5. The brazing structure according to claim 4, wherein a diameter of the first portion is equal to or larger than a diameter of the first end surface.

* * * * *